June 8, 1926.
J. E. FISHER
1,587,943
GASOLINE RESERVE GAUGE
Filed Sept. 21, 1925   2 Sheets-Sheet 1
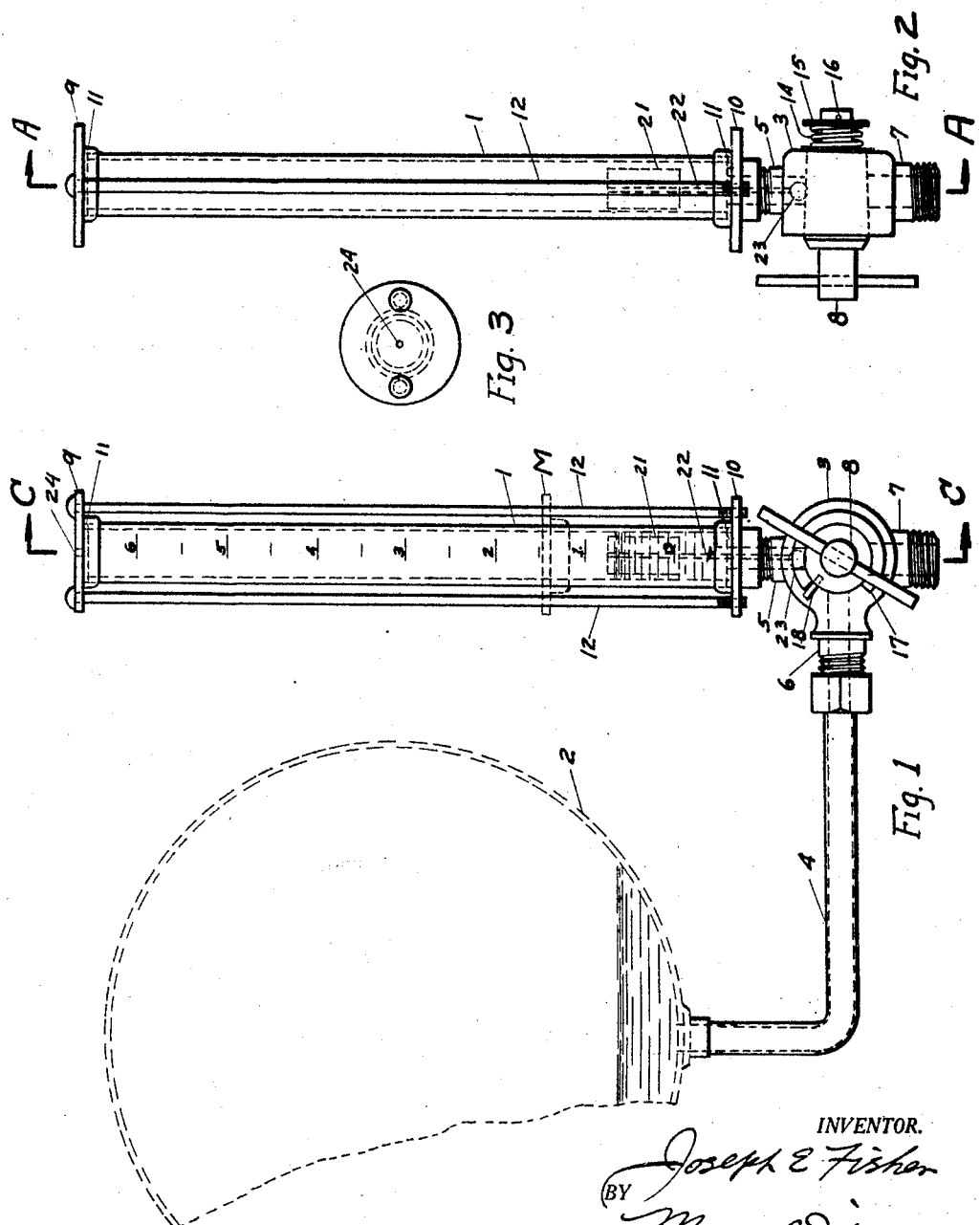

June 8, 1926.

J. E. FISHER

GASOLINE RESERVE GAUGE

Filed Sept. 21, 1925

INVENTOR
Joseph E. Fisher
By Myron J. Dikeman
ATTORNEY

Patented June 8, 1926.

1,587,943

UNITED STATES PATENT OFFICE.

JOSEPH E. FISHER, OF SPRINGWELLS, MICHIGAN.

GASOLINE-RESERVE GAUGE.

Application filed September 21, 1925. Serial No. 57,565.

The object of my invention is to provide a gauge which will at all times indicate the amount of gasoline remaining in the fuel supply tank, and which will automatically close the outlet supply pipe when the gasoline is lowered to a certain designated level within the supply tank.

Another object is to provide a special regulating valve that will automatically close the valve ports when the gasoline level reaches a certain point, and may also be operated to release the remaining supply of gasoline from the supply tank, if so desired by the operator.

A further object is to provide an automatic gasoline reserve gauge that is simple in construction, easily and efficiently operated and can be manufactured at a low cost.

These several objects are attained by the construction and arrangement of parts more fully hereinafter set forth.

Similar parts on all drawings are marked by similar numerals.

Fig. 1 is an elevation of my device showing my reserve gauge as attached to a gasoline supply tank.

Fig. 2 is a side view of the reserve gauge.

Fig. 3 is a top view of the gauge showing the means of air circulation therein.

Figure 4:
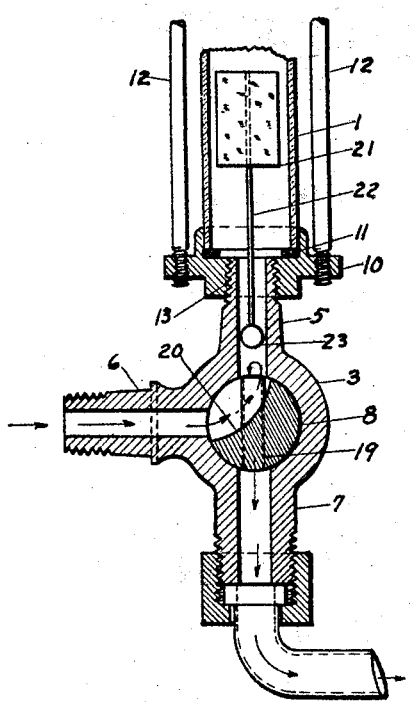
Fig. 4 is a sectional view of the gauge and valve taken on the line —AA— of Fig. 2, showing the valve in its open position, for the gasoline to flow through the reserve regulating ports.

I will now describe more fully the detailed construction of my device, referring to the drawings and the marks thereon.

The general construction of my device comprises a glass gauge tube connected directly to the bottom of a gasoline supply tank by means of a special operating valve and connecting pipe, so arranged as to position the gauge tube on an approximate level with that of the gasoline supply tank to which it is attached, allowing the gasoline to flow freely therein and keep the same level as in the supply tank. The glass gauge tube is graduated to indicate the amount of gasoline in the tank. A special valve connecting the bottom of the gauge tube with the tank, is provided with an automatic float valve, operating in such a manner as to close the port in the valve when the gasoline in the supply tank reaches a certain designated level therein, thus giving the operator warning of the low fuel supply before same becomes completely exhausted. On turning the valve to another position, a different set of ports again connect the supply tank with the outlet port and the remaining gasoline can be then drawn therefrom. The special valve operating in a manner and purpose as to produce the same effect as a special reserve gasoline tank built therein.

Figure 5:
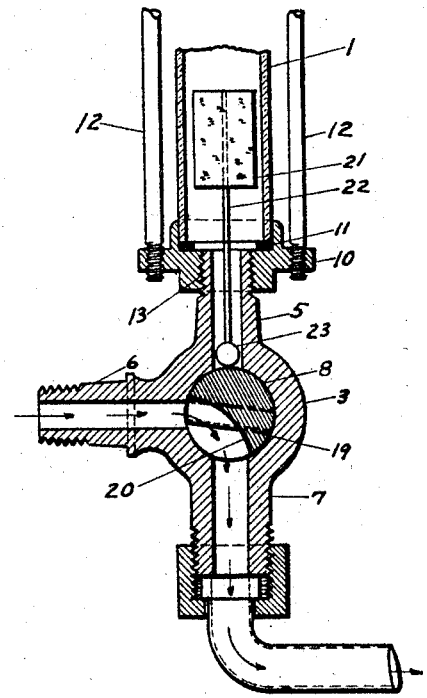
Fig. 5, is also a sectional view taken on the line —AA— of Fig. 2, showing the valve in its closed position for releasing the remaining fuel in the supply tank after the reserve port has been automatically closed by the lowering of a floating valve therein.
Figure 6:
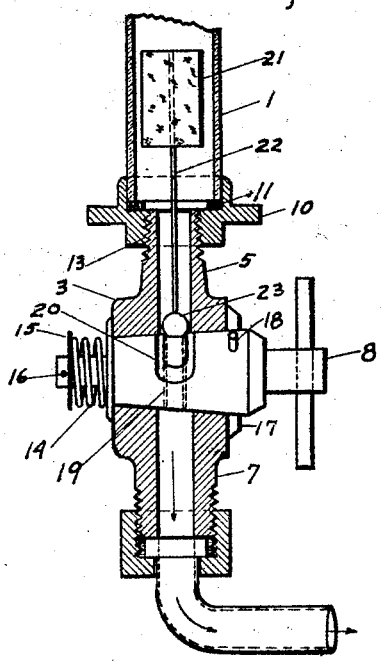
Fig. 6 is a sectional view —CC— of the regulating gauge, taken in Fig. 1, showing the construction and general arrangement of the valve and operating mechanism.
Figure 7:
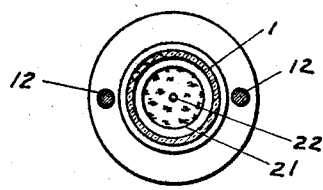
Fig. 7 is a cross-sectional view of the gauge tube showing the relative position of the float.

The glass gauge tube —1— is connected to the gasoline tank —2— by means of a three-way-valve —3— and pipe —4—, the gauge being positioned approximately at the same level as tank —2—. The valve —3— having the port connecting nipples —5—, —6— and —7— positioned in the same plane and projecting from the casing —3— at right angles to the axis of the tapered valve plug —8—. The glass tube —1— being opened at each end is provided with end caps —9— and —10—, which are recessed to fit tightly thereon and provided with a packing gasket —11— for making the joints air tight. The two end caps —9— and —10— being firmly held in place by the threaded tie rods —12— passing and engaging the projecting flanges of the caps. The bottom cap —10— is provided with a threaded opening —13— through the center thereof for receiving the threaded nipple —5— of the operating valve —3—, forming a direct passage between the gauge and valve —3—. The valve port nipple —6— is connected directly with the gasoline supply tank —2— by the pipe —4—. The port nipple —7— leads to the engine carburetor. Through the center of the valve casing —3— is fitted the tapered valve plug —8—, free to turn therein and firmly held in place by a coil spring —14— mounted on the outer end of the valve plug and held in place by the washer —15— and pin —16—. The rotation of the plug —8— within the casing —3— is regulated by a projecting boss stop —17— on the side of the casting, which engages a stop pin —18— projecting from the side of the valve plug —8—, limiting the movement of the plug —8— to an open and closed position relative to the gauge port —13—. Through the center of the valve plug —8—, and at right angles to the axis thereof, is placed a passage tube —19—, and connecting the ports in the nipples —5— and —7— and forming a straight channel through the valve, when in the open position as indicated in Fig. 1, and also in detail in Fig. 4. Through the side wall of the valve plug —8—, and in line with the port nipples —5—, —6— and —7—, is formed an external grooved passage —20—, of a width slightly greater than the passage tube —19— which passes through the plug —8—, and extends across the face of the plug sufficiently to include both ports of the nipples —5— and —6—, as shown in Fig. 4 of the drawings, allowing a free gasoline passage from the tank —2— directly into the gauge tube —1—, thence down through the plug tube —19— and out of the port in the outlet nipple —7—, to the engine carburetor. Within the glass gauge tube —1— is placed a small float —21— which will rise as the gasoline rises within the tube when filling the gasoline supply tank —2—. The float —21— carries a suspended valve pin —22— having ball valve —23— attached to the bottom end thereof. The valve pin —22— being of a sufficient length to project the ball end —23— within the nipple port —5— and engage the top end of the plug tube —19— when the gasoline level approaches a low level in the gauge tube —1— and tank —2—, closing the port through the valve plug and preventing further flow of gasoline therefrom, leaving a reserve supply of gasoline within the supply tank —2—, giving warning to the operator of the low supply of fuel. The length of the valve pin —22— determines the amount of gasoline left in the supply tank —2— at the time of the closing the valve port —19—. Upon the valve ball —23— closing the valve port, thus giving warning of low gasoline supply, the valve plug —8— may then be turned within the casing —3—, to its lower position as indicated in Fig. 5, so that the grooved passage —20— engages and incloses the ports in the nipples —6— and —7—, forming a direct passage way through the valve leading from the tank —2— to the carburetor of the engine, the ball valve —23— being supported on the smooth face of the valve plug —8—. The glass gauge —1— is graduated as indicated in Fig. 1, to show the amount of gasoline within the supply tank —2—, and the top cap —9— provided with a small hole —24— to allow for adjustment of air pressure as the level of gasoline is varied therein.

Having fully described my gasoline reserve gauge what I claim as my invention and desire to secure by Letters Patent is:

1. A gasoline reserve gauge comprising a gauge tube having a floating valve mounted therein, a three way plug valve connected to the bottom end of said gauge tube and opening therein, means for connecting said plug valve in a gasoline supply pipe, and means for regulating the flow of gasoline through said plug valve by the action of the floating valve within the gauge tube.

2. A reserve gauge comprising a vertical transparent gauge tube having a float and attached valve loosely mounted therein, a three way operating valve attached to the bottom end of said gauge tube and opening therein, said valve having an inlet and outlet port connection, a pipe for connecting the inlet port to the bottom side of a gasoline supply tank so as to position said tube on a level with said tank, said valve being provided with a passage channel connecting the inlet, outlet and gauge tube ports so as to pass the gasoline through the gauge tube port thence through the outlet port, said tube port being under direct control of the floating valve mounted within said gauge, said valve also being provided with a side passage groove which forms a part of the said passage channel for connecting the inlet and outlet ports directly.

3. A reserve gauge comprising a vertical gauge tube having a floating valve loosely mounted therein, a three way plug valve attached to the bottom end of said gauge tube and opening therein through a gauge port, said plug valve being provided with an inlet and outlet port connections, a pipe for attaching the inlet port connection to the bottom side of a gasoline supply tank so as to position the gauge tube on a level with the supply tank, said valve being provided with a special internal tubular passage and a connecting external side passage so as to connect all three ports at one time and which tubular passage may be closed by the floating valve mounted within the gauge tube, and the tank may be emptied by turning the valve plug so the side passage will connect the inlet port directly with the outlet port of said valve.

4. A reserve gauge comprising a vertical gauge tube, a float and suspended valve ball mounted within the tube and free to float therein, a three way operating valve attached to the bottom end of said gauge tube and opening therein through a gauge port, said valve being provided with an inlet and an outlet port connection, a pipe for attaching said operating valve inlet connection to the bottom side of a gasoline supply tank, a tapered valve plug fitted within said operating valve, said valve plug having a tubular passage formed therein connecting the gauge port with the outlet port of said operating valve, said tubular passage being so positioned therein as to engage the floating valve ball mounted within the gauge tube when the float is lowered to the bottom of the tube, said valve plug also being provided with a side grooved passage connecting the inlet port and gauge port when the tubular passage is positioned under the gauge port opening, forming a complete passage way through both valve and gauge tube, said side grooved passage also positioned in the valve plug so as to be turned and connect the inlet and outlet ports of the valve directly when the gauge port is closed.

In witness whereof I sign these specifications.

JOSEPH E. FISHER.